Patented Jan. 21, 1947

2,414,668

UNITED STATES PATENT OFFICE 2,414,668

ART OF TREATING WELLS

George L. Ratcliffe, Los Angeles, Calif., assignor to National Lead Company, Los Angeles, Calif., a corporation of New Jersey No Drawing. Application June 5, 1942, Serial No. 445,998

9 Claims. (Cl. 252—8.55)

This invention relates to the treatment of wells, and more particularly oil wells to bring them into production.

In the drilling of oil wells, particularly by the rotary system, a drilling fluid is used which is pumped down the drill pipe and passes upwardly outside thereof to the surface. The functions of this drilling fluid are, among others, to carry the cuttings to the surface and to wall the bore hole. The drilling fluid is generally composed of clay and water, although, in many cases, weighting materials and emulsoid colloids, such as bentonite, are employed as described in Patent No. 1,991,637. The clay and the emulsoid colloid serve to wall the bore hole and provide a mud sheath which serves its useful purpose during drilling. However, after drilling is completed this mud sheath interferes with the passage of the oil into the hole and usually must be removed by swabbing, acidizing and the like.

One of the objects of this invention is to provide a process of treatment of a well, enabling and facilitating the removal of the mud sheath, particularly contiguous the producing formation.

Further objects will appear from the detailed description in which will be set forth a number of embodiments; it is to be understood, however, that this invention is susceptible of various embodiments within the scope of the appended claims.

Generally stated, and in accordance with this invention, there is introduced contiguous a formation, particularly one containing clay or a mud sheath, a clay-dispersing agent of a character adapted to render the clay or mud dispersible in oil. More specifically, there is so introduced sufficient of an organic cationic reagent whose organic radical is exchangeable with the cation of the clay, adapted to disintegrate the clay to its ultimate particle size in order to render the clay dispersible in oil. The well can then be washed or even swabbed to remove the dispersed clay or mud or can be directly put into production.

The agent capable of employment for the above described purpose is, generally stated, a long chain cationic reagent and is preferably an amine compound suitable for this purpose. Of the agents capable of employment for this purpose are the following: an acyl derivative of diethylenediamine (known in the trade as "Amine 220", and more specifically described as 2-heptadecenyl-5-(2-hydroxyethyl)-2-imidazoline, or, what is the same thing differently named, NN' $\Delta^{9,18}$ octadecadienyl-1-(2-hydroxyethyl) ethylenediamine), 2-ethyl-hexylamine, amylammonium-stearate, triethyl-benzyl-ammonium-chloride, stearyl-triethyl ammonium-bromide, lauryl pyridinium sulphate, cetyltrimethyl-ammonium bromide, and octadecyl-beta-hydroxyethyl-morpholinium-bromide. The first two are particularly useful for the treatment of a mud cake containing bentonite, but all of them are useful in the treatment of a mud cake of ordinary clay.

The various reagents may be used by themselves or in solution. They may be used in a water solution in the form of halogen salts, as by treatment with hydrochloric acid. They may, however, be dissolved in an organic solvent, such as acetone, butyl alcohol, or in a solvent, which is both oil and water miscible, such as dioxane or isopropryl alcohol.

As a practical process, upon completion of a well, the formation may be washed with water containing the agent. Alternatively, the drilling fluid may be bailed out and the formation then washed with an oil solvent, such as kerosene or mutual solvents, such as dioxane or butyl alcohol, followed by washing with the agent by itself or in a solvent. The agent, with or without its solvent, may be introduced through the drill pipe, or a liner and tubing may be set and the agent, with or without the solvent, introduced through the tubing. The agent, with or without the solvent, may also be introduced with the gravel pack, an example of gravel packing being described in the Larsen Patent No. 2,285,291.

The useful action is believed to be as follows: the treating agent goes back into the formation and converts any clay, mud or bentonite into the oil dispersible or soluble form. This really consists of an organic base clay which has been formed from the naturally occurring clay, such as a sodium or calcium clay, by the action of the organic base, the reaction essentially being a base exchange reaction. The organic cationic reagent has an organic radical which is interchangeable with the cation of the clay to render it oil-soluble and therefore dispersible in oil. This causes disintegration or dispersion of the mud sheath or cake, which then comes into the well bore. The oil dispersible or soluble form into which the clay, mud, or bentonite is put by the action of the clay dispersing agent is one in which the clay is actually dispersed in the oil in the same way that bentonite is dispersible in water. The clay becomes disintegrated down to its ultimate particle size, just as bentonite does when placed in water, and in general soft colloidal gels will form. The action is not one of "dispersing" by keeping the gross particles from flocculating, such as is the action, for example, when an oil-soluble wetting agent is added to a kerosene suspension of ground Portland cement for the purpose of a fineness determination, but is the type of true dispersion which takes place whenever a lyophilic colloid is completely solvated by a solvent, with the resultant formation of a soft gel. It can, therefore, be readily washed out and the well put into production, where it will be washed out with the oil as the well comes into production.

Having thus described the invention, what is claimed is:

1. In the art of treating wells for production, the process comprising, introducing contiguous a formation containing clay sufficient of an organic cationic reagent whose organic radical is exchangeable with the cation of the clay, adapted to disintegrate the clay to its ultimate particle size in order to render the clay dispersible in oil.

2. In the art of treating wells for production, the process comprising, introducing contiguous a formation containing clay sufficient of an organic long chain cationic reagent whose organic radical is exchangeable with the cation of the clay, adapted to disintegrate the clay to its ultimate particle size in order to render the clay dispersible in oil.

3. In the art of treating wells for production, the process comprising, introducing contiguous a formation containing clay sufficient of an organic cationic amine compound whose organic radical is exchangeable with the cation of the clay, adapted to disintegrate the clay to its ultimate particle size in order to render the clay dispersible in oil.

4. In the art of treating wells for production, the process comprising, introducing contiguous a formation containing clay, an agent adapted to render the clay dispersible in oil and of a class consisting of an acyl derivative of diethylene - diamine, 2 - ethyl-hexylamine, amyl - ammonium-stearate, triethyl-benzyl-ammonium-chloride, stearyl-triethyl ammonium bromide, lauryl pyridinium sulphate, cetyltrimethyl-ammonium bromide, and octadecyl-beta-hydroxyethyl-morpholinium-bromide.

5. In the art of treating drilled wells containing a mud sheath, the process comprising, introducing contiguous a sheath part to be dispersed, sufficient of an organic cationic reagent whose organic radical is exchangeable with the cation of the clay, adapted to disintegrate the clay to its ultimate particle size in order to render the clay dispersible in oil.

6. In the art of treating drilled wells containing a mud sheath, the process comprising, introducing contiguous a sheath part to be dispersed, a long chain cationic reagent whose organic radical is exchangeable with the cation of the clay, adapted to disintegrate the clay to the ultimate particle size in order to render the clay dispersible in oil.

7. In the art of treating drilled wells containing a mud sheath, the process comprising, introducing contiguous a sheath part to be dispersed, sufficient of an organic cationic amine compound whose organic radical is exchangeable with the cation of the clay, adapted to disintegrate the clay to its ultimate particle size in order to render the clay dispersible in oil.

8. In the art of treating wells for production, the process comprising, introducing contiguous a formation containing clay, sufficient of an organic cationic reagent whose organic radical is exchangeable with the cation of the clay, adapted to disintegrate the clay to its ultimate particle size in order to render the clay dispersible in oil and flushing out the dispersed clay.

9. In the art of treating wells for production, the process comprising, introducing contiguous a formation containing clay, sufficient of an organic cationic reagent whose organic radical is exchangeable with the cation of the clay, adapted to disintegrate the clay to its ultimate particle size in order to render the clay dispersible in oil and putting the well into production.

GEORGE L. RATCLIFFE.